(12) United States Patent
Keeler et al.

(10) Patent No.: US 9,201,790 B2
(45) Date of Patent: Dec. 1, 2015

(54) SYSTEM AND METHOD OF MATCHING DATA RATES

(75) Inventors: Stanton MacDonough Keeler, Longmont, CO (US); Todd Strope, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 422 days.

(21) Appl. No.: 11/869,345

(22) Filed: Oct. 9, 2007

(65) Prior Publication Data

US 2009/0094389 A1 Apr. 9, 2009

(51) Int. Cl.
| G06F 13/36 | (2006.01) |
| G06F 13/12 | (2006.01) |
| G06F 13/38 | (2006.01) |
| G06F 12/06 | (2006.01) |
| G06F 3/06 | (2006.01) |

(52) U.S. Cl.
CPC ............. *G06F 12/06* (2013.01); *G06F 3/064* (2013.01); *G06F 3/0607* (2013.01); *G06F 3/068* (2013.01)

(58) Field of Classification Search
USPC .......................................................... 710/4
See application file for complete search history.

(56) References Cited

U.S. PATENT DOCUMENTS

| 4,371,926 | A | * | 2/1983 | Yamaura et al. ................ 710/4 |
| 4,433,379 | A | * | 2/1984 | Schenk et al. ................... 710/4 |
| 4,450,519 | A | * | 5/1984 | Guttag et al. ................... 712/33 |
| 4,481,579 | A | * | 11/1984 | Kinghorn ........................ 710/4 |
| 5,191,655 | A | * | 3/1993 | Sarkissian ...................... 710/4 |
| 5,265,218 | A |   | 11/1993 | Testa et al. |
| 5,287,476 | A | * | 2/1994 | Keener et al. .................. 710/4 |
| 5,509,138 | A | * | 4/1996 | Cash et al. .................... 711/170 |
| 5,517,648 | A | * | 5/1996 | Bertone et al. ................ 710/244 |
| 5,592,629 | A |   | 1/1997 | Gamble |
| 5,603,052 | A | * | 2/1997 | Chejlava et al. ............... 710/4 |
| 5,634,073 | A | * | 5/1997 | Collins et al. .................. 710/5 |
| 5,650,967 | A |   | 7/1997 | Seibert |
| 5,732,405 | A | * | 3/1998 | Ho et al. ....................... 711/3 |

(Continued)

OTHER PUBLICATIONS

Authors: Hsieh, Jen-Wei; Tsai, Yi-Lin; Kuo, Tei-Wei; Lee, Tzao-Lin, Title: Configurable Flash-Memory Management: Performance versus Overheads, Date: Nov. 2008, Publisher: IEEE Transactions on Computers, vol. 57, Issue 11, pp. 1571-1583.*

*Primary Examiner* — Henry Tsai
*Assistant Examiner* — Christopher Bartels
(74) *Attorney, Agent, or Firm* — Cesari & Reed LLP; Kirk A. Cesari

(57) ABSTRACT

The present disclosure is directed to systems and methods of matching data rates. In a particular embodiment, a device includes a first data bus and a controller having a first output coupled to the first data bus to provide data to the first data bus. The device also includes a first memory of a first type coupled to the first data bus. The first memory may have a first input to receive data from the controller via the first data bus. The device also includes logic coupled to the first data bus. The logic may have a second input coupled to the first data bus to receive data from the controller via the first data bus. The device may also include a second data bus coupled to the logic. The logic may have a second output coupled to the second data bus to provide data to the second data bus. The logic may also include a second memory of a second type coupled to the second data bus. The second memory may have a third input to selectively receive data from the logic via the second data bus. The logic may be adapted to receive data and select the first memory or the second memory to store data.

18 Claims, 4 Drawing Sheets

(56) References Cited

U.S. PATENT DOCUMENTS

| | | | |
|---|---|---|---|
| 5,734,924 A * | 3/1998 | Cheng et al. ..................... 710/4 |
| 5,790,831 A | 8/1998 | Lin et al. |
| 5,790,884 A * | 8/1998 | Weinman et al. ................. 710/4 |
| 5,793,992 A * | 8/1998 | Steele et al. .................. 710/113 |
| 5,799,161 A * | 8/1998 | Merrick ........................ 710/305 |
| 5,956,288 A | 9/1999 | Bermingham et al. |
| 5,999,476 A | 12/1999 | Dutton et al. |
| 6,029,208 A * | 2/2000 | Kim .................................. 710/4 |
| 6,061,754 A | 5/2000 | Cepulis et al. |
| 6,088,761 A | 7/2000 | Aybay |
| 6,131,139 A * | 10/2000 | Kikuchi et al. ............... 711/103 |
| 6,134,630 A | 10/2000 | McDonald et al. |
| 6,178,467 B1 * | 1/2001 | Faucher et al. ................... 710/4 |
| 6,205,500 B1 * | 3/2001 | Sabotta et al. ................ 710/100 |
| 6,247,084 B1 * | 6/2001 | Apostol et al. ................ 710/108 |
| 6,466,736 B1 | 10/2002 | Chen et al. |
| 6,546,489 B1 * | 4/2003 | Frank et al. ................... 713/187 |
| 6,574,142 B2 | 6/2003 | Gelke et al. |
| 6,654,195 B1 * | 11/2003 | Frank et al. ..................... 360/75 |
| 6,654,830 B1 * | 11/2003 | Taylor et al. ................... 710/74 |
| 6,744,692 B2 * | 6/2004 | Shiota et al. ............. 365/230.03 |
| 6,754,721 B2 * | 6/2004 | Heckel .............................. 710/4 |
| 6,799,283 B1 * | 9/2004 | Tamai et al. ................. 714/6.12 |
| 6,813,647 B2 * | 11/2004 | Moriwaki et al. ................. 710/4 |
| 6,850,995 B1 | 2/2005 | Shishizuka et al. |
| 6,880,068 B1 * | 4/2005 | McGrath ........................ 712/220 |
| 6,910,092 B2 | 6/2005 | Calvignac et al. |
| 6,990,536 B2 * | 1/2006 | Vishlitzky et al. ............... 710/4 |
| 7,075,784 B2 | 7/2006 | Sullivan |
| 7,146,456 B2 * | 12/2006 | Suh ............................... 711/105 |
| 7,191,254 B2 * | 3/2007 | Yamada et al. ................... 710/4 |
| 7,406,628 B2 * | 7/2008 | Edgar et al. ..................... 714/43 |
| 7,467,251 B2 * | 12/2008 | Park et al. ..................... 710/307 |
| 7,606,970 B2 * | 10/2009 | Lee ............................... 711/112 |
| 7,610,445 B1 * | 10/2009 | Manus et al. ................. 711/113 |
| 8,090,398 B2 * | 1/2012 | Nakagawa et al. .......... 455/550.1 |
| 2001/0002174 A1 * | 5/2001 | Harari et al. ............. 365/185.33 |
| 2001/0023462 A1 * | 9/2001 | Kondo et al. ..................... 710/4 |
| 2001/0041587 A1 * | 11/2001 | Gushiken ...................... 455/556 |
| 2001/0042158 A1 * | 11/2001 | Hasbun et al. ............... 711/103 |
| 2002/0002662 A1 * | 1/2002 | Olarig et al. ................... 711/167 |
| 2002/0051394 A1 * | 5/2002 | Tobita et al. .................. 365/221 |
| 2002/0083262 A1 * | 6/2002 | Fukuzumi ..................... 711/103 |
| 2002/0154543 A1 * | 10/2002 | Conley et al. ............ 365/185.11 |
| 2002/0156973 A1 | 10/2002 | Ulrich et al. |
| 2002/0191311 A1 | 12/2002 | Ulrich et al. |
| 2003/0014568 A1 * | 1/2003 | Kishi et al. ........................ 710/4 |
| 2003/0023815 A1 * | 1/2003 | Yoneyama et al. ........... 711/133 |
| 2003/0037230 A1 * | 2/2003 | Verinsky et al. .................. 713/1 |
| 2004/0015664 A1 * | 1/2004 | Ciesinger et al. ............. 711/154 |
| 2004/0073762 A1 * | 4/2004 | Roche et al. .................. 711/168 |
| 2004/0143710 A1 | 7/2004 | Walmsley |
| 2004/0162932 A1 * | 8/2004 | Mizushima et al. .......... 711/103 |
| 2004/0186975 A1 * | 9/2004 | Saha .............................. 711/170 |
| 2004/0193743 A1 * | 9/2004 | Byers et al. ....................... 710/4 |
| 2005/0027908 A1 | 2/2005 | Ong et al. |
| 2005/0086420 A1 | 4/2005 | Wilcox et al. |
| 2005/0141312 A1 * | 6/2005 | Sinclair et al. ................. 365/222 |
| 2005/0166004 A1 | 7/2005 | Campanale et al. |
| 2005/0204091 A1 * | 9/2005 | Kilbuck et al. ............... 711/103 |
| 2005/0237327 A1 | 10/2005 | Rubinstein et al. |
| 2005/0243609 A1 * | 11/2005 | Yang et al. ............... 365/189.05 |
| 2005/0273538 A1 * | 12/2005 | Teranuma et al. ............ 710/110 |
| 2006/0090017 A1 | 4/2006 | Kim et al. |
| 2006/0129701 A1 * | 6/2006 | Qawami et al. ................... 710/4 |
| 2006/0149873 A1 | 7/2006 | Underwood et al. |
| 2006/0271919 A1 * | 11/2006 | Moyer .......................... 717/136 |
| 2007/0067561 A1 | 3/2007 | Kim |
| 2007/0101242 A1 * | 5/2007 | Yancey et al. ................. 714/776 |
| 2007/0130439 A1 * | 6/2007 | Andersson et al. ........... 711/200 |
| 2007/0136523 A1 * | 6/2007 | Bonella et al. ................ 711/113 |
| 2007/0150662 A1 * | 6/2007 | Hara et al. ..................... 711/137 |
| 2007/0198796 A1 * | 8/2007 | Warren ......................... 711/165 |
| 2007/0233933 A1 * | 10/2007 | Wang et al. ................... 711/100 |
| 2007/0288683 A1 * | 12/2007 | Panabaker et al. ............ 711/101 |
| 2008/0126577 A1 * | 5/2008 | Bae et al. ........................... 710/4 |
| 2008/0240234 A1 * | 10/2008 | Hung et al. ............... 375/240.02 |
| 2008/0270632 A1 * | 10/2008 | Hong et al. ....................... 710/4 |
| 2008/0276009 A1 * | 11/2008 | Mesa et al. ........................ 710/4 |
| 2008/0288714 A1 * | 11/2008 | Salomon et al. .............. 711/103 |
| 2008/0307115 A1 * | 12/2008 | Ohtsuka ............................ 710/4 |
| 2008/0307116 A1 * | 12/2008 | Boyd et al. ....................... 710/4 |
| 2009/0049205 A1 * | 2/2009 | Park .................................. 710/4 |
| 2010/0211851 A1 * | 8/2010 | Dixon ............................ 714/763 |
| 2012/0311193 A1 * | 12/2012 | Erdmann et al. ................. 710/5 |

* cited by examiner

SYSTEM AND METHOD OF MATCHING DATA RATES

FIELD OF THE DISCLOSURE

The present disclosure relates generally to matching data rates.

BACKGROUND

Electronic devices, such as disc drives, are frequently being updated to include more memory or different types of memory. Many times, a manufacturer may be required to use a new type of memory. Often, the new type of memory may not be compatible with an existing data bus architecture. That is, the new memory type may have a data transfer rate that is not supported by the current controller and memory in the electronic device. Therefore, there is a need for an improved system and method of matching data rates.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present invention.

The present disclosure is directed to a device including, in a particular embodiment, a first data bus and a controller having a first output coupled to the first data bus to provide data to the first data bus. The device also includes a first memory of a first type coupled to the first data bus. The first memory may have a first input to receive data from the controller via the first data bus. The device also includes logic coupled to the first data bus. The logic may have a second input coupled to the first data bus to receive data from the controller via the first data bus. The device may also include a second data bus coupled to the logic. The logic may have a second output coupled to the second data bus to provide data to the second data bus. The logic may also include a second memory of a second type coupled to the second data bus. The second memory may have a third input to selectively receive data from the logic via the second data bus. The logic may be adapted to receive data and select the first memory or the second memory to store data.

In another embodiment, a method may include providing a first portion of an address space mapped to a first memory and a second portion of the address space mapped to a second memory. The method may also include receiving data at a third memory via a first data bus at a first data transfer rate, the first data bus coupled to the first memory and the third memory in parallel. The method may also include sending the data from the third memory to the second memory via a second data bus at a second data transfer rate when the second memory is selected to store the data. The second data transfer rate may be distinct from the first data transfer rate.

Figure 1:
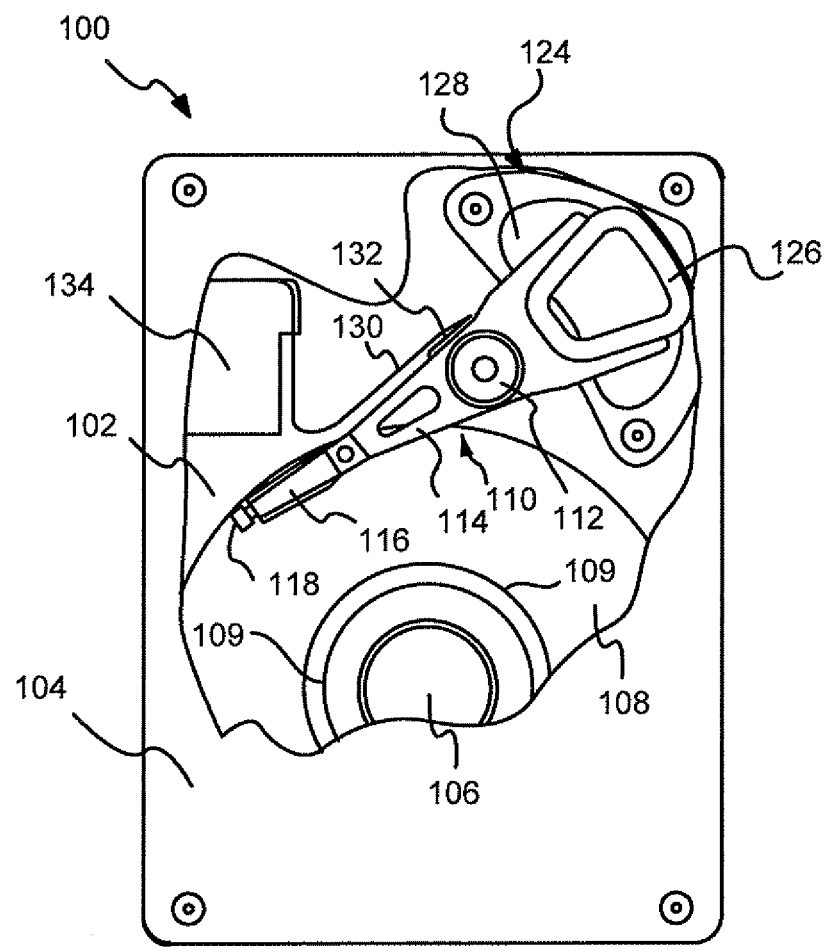
FIG. 1 is a cutaway view of an illustrative embodiment of a disc drive.

Referring to FIG. 1, a cutaway view of an illustrative embodiment of a disc drive 100 is shown. In a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 10 that rotate about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

Figure 2:
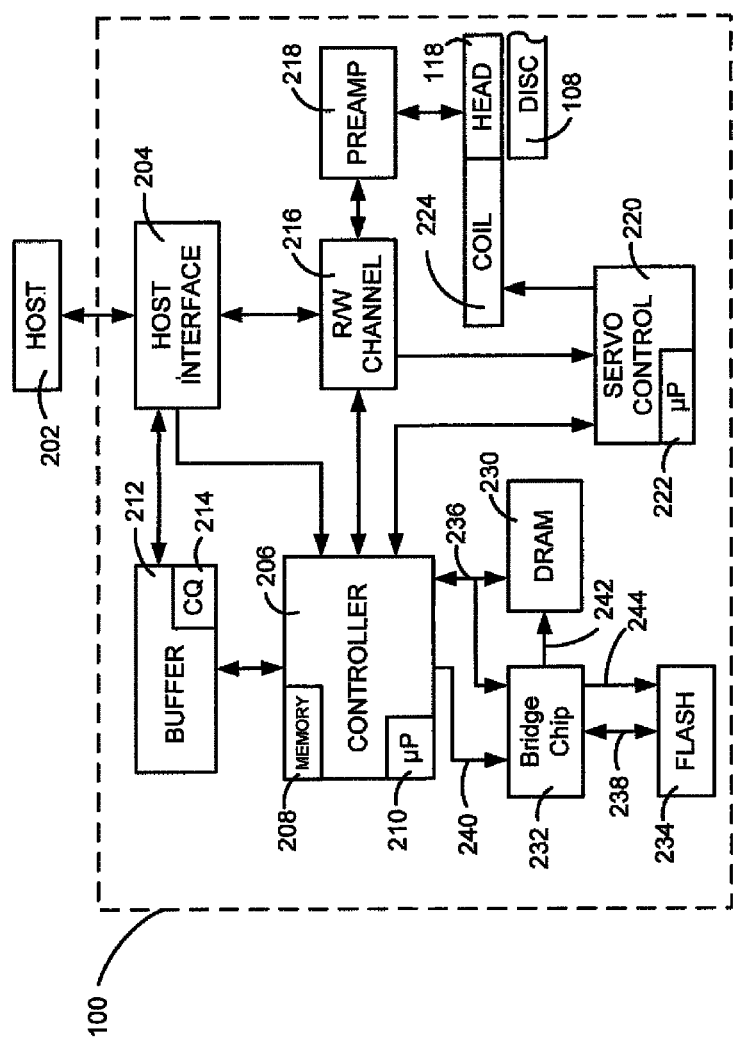
FIG. 2 is a block diagram of an illustrative embodiment of a disc drive system.

FIG. 2 provides a functional block diagram of the disc drive 100 shown in FIG. 1. A hardware/firmware based interface circuit 204 communicates with a host device 202 (such as a laptop computer). The disc drive 100 includes a programmable controller 206 with associated memory 208 and processor 210. The programmable controller 206 may be coupled to a buffer 212. The buffer 212 can temporarily store user data during read and write operations, and may include a command queue (CQ) 214 where access operations can be temporarily stored pending execution.

FIG. 2 further shows the disc drive 100 to include a read/write (R/W) channel 216 which encodes data during write operations and reconstructs user data retrieved from the disc(s) 108 during read operations. A preamplifier/driver circuit (preamp) 218 applies write currents to the head(s) 118 and provides pre-amplification of readback signals.

A servo control circuit 220 uses servo data to provide the appropriate current to the coil 224 to position the head(s) 118. The controller 206 communicates with a processor 222 to move the head(s) 118 to the desired locations on the disc(s) 108 during execution of the various pending commands in the command queue 214.

The disc drive 100 also includes a first data bus 236 coupling the controller 206 to a first memory 230. In a particular embodiment, the first memory is a volatile solid state memory. In another particular embodiment, the first memory is synchronous dynamic random access memory (SDRAM). The first data bus 236 may also be coupled to a bridge chip 232. A second memory 234 may be coupled to the bridge chip 232 via a second data bus 244. In a particular embodiment, the second memory 234 is a non-volatile solid state memory. In another particular embodiment, the second memory 234 is a flash memory. In yet another particular embodiment, the second memory 234 has a different data transfer rate than the first memory 230.

In a particular embodiment, the bridge chip 232 can buffer data from the first data bus 236 and send the data over the second data bus at a different data transfer rate. The bridge chip 232 may receive a chip select signal from the controller 206 via a chip select line 240. The bridge chip 232 may provide the chip select signal to the first memory 230 via a chip select line 242 or to the second memory 234 via a chip select line 238.

In another particular embodiment, an address space associated with the first data bus may be partially mapped to the first memory 230 and partially mapped to the second memory 234. The bridge chip 232 may determine which memory to store data in based on the address space and may provide the chip select signal to enable the selected memory to store data.

Figure 3:
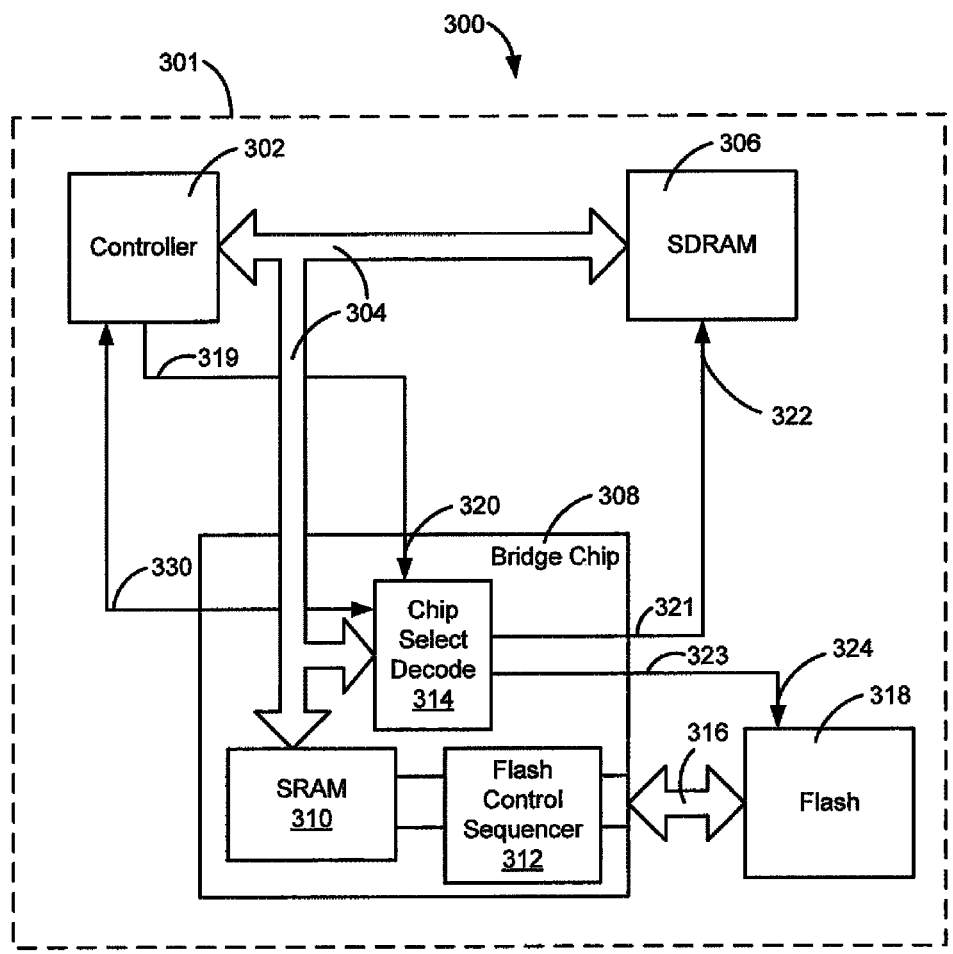
FIG. 3 is a block diagram of an illustrative embodiment of a system to match data rates.

Referring to FIG. 3, a block diagram of an illustrative embodiment of a system to match data rates is shown and generally designated 300. The system 300 includes an electronic device 301. In a particular embodiment the electronic device 301 may be a single device. In another particular embodiment, the electronic device 301 may be contained in or about a single housing. In yet another particular embodiment, the electronic device may be a data storage device, such as a disc drive or a solid-state data storage device. In even a further particular embodiment, the electronic device 301 may be any electronic device that uses two memories with different data transfer rates.

The electronic device 301 can include a controller 302 coupled to a first data bus 304 having a first data transfer rate. The first data transfer rate may be based on a first memory 306 coupled to the first data bus 304. In a particular embodiment, the first memory 306 may be a volatile memory. In another particular embodiment, the first memory 306 may be a solid state memory. In yet another particular embodiment, the memory 306 may be a SDRAM.

The electronic device 301 can also include logic 308. In a particular embodiment, the logic 308 may be an integrated circuit (IC), also referred to as a bridge chip. The controller 302 may have an output 319 coupled to an input 320 of the logic 308. The logic 308 may have an output 321 coupled to an input 322 of the first memory 306.

The electronic device can also include a second data bus 316 having a second data transfer rate. The second data transfer rate may be based on a second memory 318 coupled to the second data bus 316. In a particular embodiment, the second data transfer rate may be different than the first data transfer rate. An output 323 of the logic 308 may be coupled to an input 324 of the second memory 318. In a particular embodiment, the second memory 318 may be a non-volatile memory. In another particular embodiment, the second memory 318 may be a solid state memory. In yet another particular embodiment, the second memory 318 may be a flash memory.

In a particular embodiment, the logic 308 may include a third memory 310. The third memory 310 may be coupled to the first data bus 304 and adapted to work as a first-in first-out (FIFO) buffer. In another particular embodiment, the third memory 310 may be a solid state memory. In yet another particular embodiment, the third memory 310 may be a synchronous random access memory (SRAM). The third memory 310 may have a data transfer rate similar to a data transfer rate of the first memory 306. A size of the third memory 310 may be determined based on the first data transfer rate and the second data transfer rate. For example, the size of the third memory may be sixty-four (64) kilobytes.

The logic 308 can also include memory select logic 314. The memory select logic may comprise discrete components, logic gates, a controller, or any combination thereof. The memory select logic 314 may receive the input 320. The memory select logic 314 may provide a chip select signal to the first memory 306 or the second memory 318 based on an address received from the controller 302. The memory select logic 314 may be coupled to the output 323 and the output 321.

The logic 308 can also include memory control logic 312. The memory control logic 312 may comprise discrete components, logic gates, a controller, or any combination thereof. In a particular embodiment, the memory control logic 312 comprises a flash memory controller or sequencer. The memory control logic 312 may be coupled to the second data bus 316.

During operation, the controller 302 may control storing data to the first memory 306 and the second memory 316. The controller 302 may send data to the first memory 306 and the third memory 310 via the first data bus 304. In a particular embodiment, the data transfer rate between the controller 302 and the logic 308 via the first data bus 304 may be significantly faster than the data transfer rate between the logic 308 and the second memory 318. The third memory 310 can receive the data from the first data bus 304 at the faster data transfer rate. This can then allow the first data bus 304 to be used to transfer data to/from the first memory 306.

In a particular embodiment, an address space associated with the first data bus 304 may be partially mapped to the first memory 306 and partially mapped to the second memory 318. The logic 308 may determine which memory to store data in based on the address space. The controller 302 may configure the address space assignment in the logic 308 via a serial port 330. The controller 302 may assign a first part of the address space to the first memory 306 and a second part of the address space to the second memory 318. This assigning may also be referred to as mapping the address space. The first part of the address space and the second part of the address space may be distinct. In a particular embodiment, the address space may be mapped using a logical block address (LBA) to physical block address (PBA) mapping system. The address spaces mapped to the first memory device 306 and the second memory 318 may be flexible; for example, the controller 302 may map any LBA to the first memory 306 or any LBA to the second memory 318.

In a particular embodiment, the controller 302 may provide a chip select signal at the output 319. The chip select signal may be a signal to enable a memory to store data. For example, the chip select signal may be a specific voltage level within a range of a program voltage that enables a memory to store data.

The memory select logic 314 may receive the chip select signal at the input 320. The memory select logic may also receive an address of the data to be stored. Based on the address and an assignment of the address space, the memory select logic 314 can determine when the data is to be stored in the first memory 306 and when the data is to be stored in the second memory 318. When the memory select logic 314 determines the address is in the mapping of the first memory 306, the memory select logic 314 can provide a chip select signal to the first memory 306 at the output 321. When the memory select logic 314 determines the address is in the mapping of the second memory 318, the memory select logic 314 can provide a chip select signal to the second memory 318 at the output 323. A chip select signal can enable the receiving memory to enter a program mode in which the memory can store the data.

The memory control logic 312 may communicate between the third memory 310 and the second memory 318 at the slower data transfer rate of the second memory 318. The memory control logic 312 can determine the timing of data transfers from the third memory 310 to the second memory 318.

The logic 308 and the second memory 318 may be added to a system having a controller and another memory to provide additional benefits of the second memory 318. For example, the second memory 318 may be faster than an existing memory. Also, the second memory 318 may be non-volatile. Further, the second memory 318 may provide newer features or benefits not available at the time a system was designed. The logic 308 can be coupled to an existing bus between a controller and a memory device. The logic 308 allows for the second memory 318 to have a different bus speed than the existing bus without the need to change an original controller or original memory.

Figure 4:
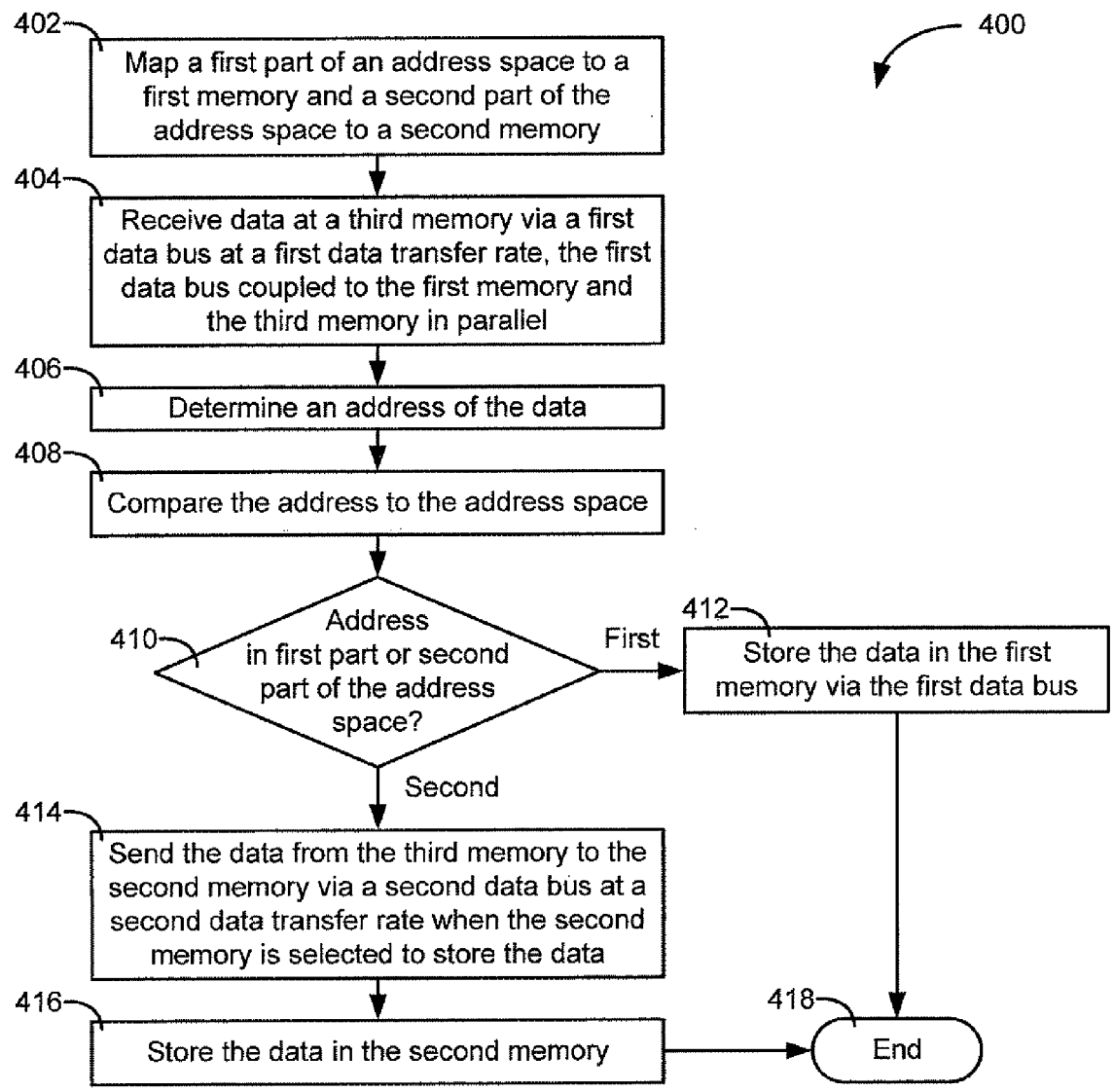
FIG. 4 is a flow diagram of an illustrative embodiment of a method to match data rates.

Referring to FIG. 4, a flow diagram of an illustrative embodiment of a method to match data rates is shown and generally designated 400. The method 400 may include mapping a first part of an address space to the first memory and mapping a second part of the address space to the second memory, at 402. In a particular embodiment, the first part of the address space comprises a first set of logical block addresses (LBAs), the second part of the address space comprises a second set of LBAs.

The method 400 may also include receiving data at a third memory via a first data bus at a first data transfer rate, at 404. In a particular embodiment, an address associated with the data may be a logical block address. In another particular embodiment, the first data bus can be coupled to the first memory and the third memory in parallel. In yet another particular embodiment, the data is received from a controller by the first memory and the third memory via the first data bus.

The method 400 may also include determining an address of the data, at 406. The method may then compare the address to the address space, at 408. The method can determine when the address is in the first part or the second part of the address space, at 410. The method may select the first memory to store the data when an address associated with the data corresponds to the first part of the address space and select the second memory to store the data when the address associated with the data corresponds to the second part of the address space.

When the address is in the first part of the address, the first memory can be selected to store the data. The method 400 may store the data in the first memory via the first data bus, at 412. In a particular embodiment, the method 400 may include sending a first signal to the first memory to enable the first memory to store the data when the first memory is selected to store the data. The method may then end, at 418.

When the address is in the second part of the address, the second memory can be selected to store the data. The method 400 sends the data from the third memory to the second memory via a second data bus at a second data transfer rate when the second memory is selected to store the data, at 414. The second data transfer rate may be distinct from the first data transfer rate. In a particular embodiment, the method 400 may include sending a second signal to the second memory to enable the second memory to store the data when the second memory is selected to store the data. The data may then be stored in the second memory, at 416. The method may then end, at 418.

In a particular embodiment, the method 400 may receive a chip select signal from a controller, such as controller 302 shown in FIG. 3, and provide the chip select signal to enable either the first memory or the second memory to store the data based on an identification of the address in the address space.

In a particular embodiment, the first memory may be a volatile solid state memory. In another particular embodiment, the second memory may be a non-volatile solid state memory. In yet another particular embodiment, the first memory, the second memory, and the third memory may be part of a single disc drive, such as the disc drive 100 shown in FIG. 1. In even yet another particular embodiment, the methods described herein may be implemented in an electronic device or a data storage device, such as the data storage device 200 shown in FIG. 2 or the disc drive 100 shown in FIG. 1.

In accordance with various embodiments, the methods and operations described herein may be implemented as one or more software programs running on a computer processor or controller, such as the controller 302. In accordance with another embodiment, the methods and operations described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device comprising:
   a bridge chip including:
      a first chip select output directly connected to a first memory to selectively enable the first memory to store data received from a first data bus;
      a second chip select output directly connected to a second memory to selectively enable the second memory to store data via a second data bus;
      memory selection logic configured to selectively enable the first memory and the second memory to store data;
      an output coupled to a second data bus directly connected to the second memory;
   a data storage controller directly connected to the bridge chip and directly connected to the first memory via the first data bus, through which the data storage controller stores data in the first memory when the memory selection logic selectively enables the first memory, and the data storage controller is indirectly coupled to the second memory via the bridge chip; and
   wherein the bridge chip receives data from the data storage controller via a third data bus and passes received data to the second memory via the direct connection of the second data bus to store the received data when the memory selection logic selectively enables the second memory.

2. The device of claim 1 further comprising:
   wherein the data storage controller assigns at least one first logical block address (LBA) to the first memory and assigns at least one second LBA to the second memory; and
   wherein the memory selection logic of the bridge chip selects the first memory or the second memory based on when data is to be stored to the at least one first LBA or the at least one second LBA.

3. The device of claim 1 further comprising:
   wherein the first data bus allows a first data transfer rate between the controller and the first memory;
   wherein the second data bus allows a second data transfer rate between the bridge chip and the second memory;
   wherein the first data transfer rate is determined at least in part by the first memory and the second data transfer rate is determined at least in part by the second memory; and
   wherein the first data transfer rate and the second data transfer rate are distinct.

4. The device of claim 1 wherein the first memory comprises a volatile memory and the second memory comprises a non-volatile memory.

5. The device of claim 1 wherein the second memory comprises a flash memory device.

6. The device of claim 1 wherein the data storage controller is coupled to the bridge chip to provide a memory space configuration signal to the bridge chip, and wherein the bridge chip is configured to assign a first part of a memory address space to the first memory and a second part of the memory address space to the second memory based on the memory space configuration signal.

7. The device of claim 1 wherein the bridge chip comprises an integrated circuit having:
   a third memory to store the received data; and
   control logic to selectively control transfer of the received data from the third memory to the second memory.

8. The device of claim 1 wherein the device comprises a single removable disc drive including the bridge chip, data storage controller, first memory, and second memory.

9. The device of claim 1, wherein the bridge chip and the data storage controller are physically distinct integrated circuits, and the first memory and second memory are not part of either of the physically distinct integrated circuits.

10. A device comprising:
    a controller, which receives user data for storage, directly connected to a first memory via a first data bus and indirectly coupled to a second memory via a bridge chip,
    the bridge chip directly connected to the first memory to enable storing data at the first memory, directly connected to the second memory to enable storing memory at the second memory, and is configured to selectively store data at the first memory and the second memory, and
    wherein the controller is coupled to the bridge chip to provide a memory space configuration signal to the bridge chip, and wherein the bridge chip is configured to assign a first part of a memory address space to the first memory and a second part of the memory address space to the second memory based on the memory space configuration signal.

11. A device comprising:
    a controller, which receives user data for storage, directly connected to a first memory via a first data bus and indirectly coupled to a second memory via a bridge chip,
    the bridge chip directly connected to the first memory to enable storing data at the first memory, directly connected to the second memory to enable storing memory at the second memory, and is configured to selectively store data at the first memory and the second memory,
    the bridge chip comprises an integrated circuit having:
    a third memory to store data; and
    memory control logic configured to communicate between the third memory and the second memory such that the memory control logic can determine a timing of data transfers from the third memory to the second memory.

12. A device, comprising:
    a removable data storage device having multiple types of memory and a hardware interface configured to send commands to a host and receive commands from the host, the removable data storage device including:
    a first data bus;
    a first memory of a first type coupled to the first data bus;
    a controller directly connected to the first memory via the first data bus to provide data to the first memory, the controller having a first chip select output to enable a memory to store data;
    a logic circuit coupled to the first data bus;
    a second data bus coupled to an output of the logic circuit;
    a second memory of a second type coupled to the second data bus to selectively receive data from the logic circuit; and the logic circuit having a second chip select output directly connected to the first memory to enable the first memory to store data received from the first data bus and a third chip select output directly connected to the second memory to enable the second memory to store data received from the second data bus, the logic circuit configured to:
receive the first chip select output from the controller along with a memory address to store data to;
select one of the first memory and the second memory to store data based on the memory address;
enable the first memory to store data by enabling the second chip select output when the first memory is selected; and
enable the second memory to store data by enabling the third chip select output when the second memory is selected.

13. The device of claim 12 further comprising:
the controller is configured to assign at least one first logical block address (LBA) to the first memory and assign at least one second LBA to the second memory; and
the logic circuit is configured to select one of the first memory and the second memory to store data based on an indication of a LBA received from the controller.

14. The device of claim 12 wherein the controller is directly connected to the logic circuit to provide a memory space configuration signal, and the logic circuit is configured to assign a first part of a memory address space to the first memory and a second part of the memory address space to the second memory based on the memory space configuration signal.

15. The device of claim 12 wherein the logic circuit comprises an integrated circuit having:
a buffer to store data;
control logic to selectively control transfer of data from the buffer to the second memory; and
a data output responsive to the control logic and directly connected to the second data bus.

16. The device of claim 12 further comprising:
the first memory has a first data transfer protocol;
the second memory has a second data transfer protocol that is distinct from the first data transfer protocol; and
the controller is not compatible to communicate via the first data transfer protocol and the second data transfer protocol.

17. The device of claim 16 further comprising:
the first data bus has a first data transfer rate between the controller and the first memory;
the second data bus has a second data transfer rate between the bridge chip and the second memory; and
the first data transfer rate and the second data transfer rate are distinct.

18. A bridge integrated circuit comprising:
memory select logic including:
inputs to receive addresses on a first bus, a chip select input signal and configuration information; and
outputs to provide a first chip select output signal to a first memory and a second chip select output signal to a second memory responsive to received addresses and chip select input signal;
a buffer coupleable to transfer data between the first bus and the second memory; and
the data storage controller is directly connected to the first memory via the first data bus without an intermediary.

* * * * *